United States Patent [19]
Veenendaal

[11] Patent Number: 4,930,858
[45] Date of Patent: Jun. 5, 1990

[54] FIBER OPTIC MOUNTING AND ALIGNMENT APPARATUS

[75] Inventor: Cornelis T. Veenendaal, Cornelius, Oreg.

[73] Assignee: Tektronix, Inc., Beaverton, Oreg.

[21] Appl. No.: 334,789

[22] Filed: Apr. 10, 1989

Related U.S. Application Data

[63] Continuation of Ser. No. 192,314, May 9, 1988, abandoned.

[51] Int. Cl.$^5$ ............................ G02B 6/36; G02B 7/26
[52] U.S. Cl. ................................ 350/96.20; 350/96.21
[58] Field of Search .......................... 350/96.20, 96.21

[56] References Cited

U.S. PATENT DOCUMENTS

| | | | |
|---|---|---|---|
| 4,447,119 | 5/1984 | Beasley | 350/96.18 |
| 4,563,057 | 1/1986 | Ludman et al. | 350/96.18 |
| 4,639,076 | 1/1987 | Mikolaicyk et al. | 350/96.20 |

Primary Examiner—William L. Sikes
Assistant Examiner—Robert E. Wise
Attorney, Agent, or Firm—William K. Bucher

[57] ABSTRACT

A mounting and aligning apparatus for a fiber optic cable is formed of segments interconnected by integrally formed shoulders that are rotated with respect to each other so as to be orthogonal. Apertures are formed in each segment normal to the surfaces of the segments and co-existent with a central axis for insertion of the fiber optic cable. The integrally formed shoulders are stressed past the elastic limit of the material used to produce a starting bias point for the adjustment of the fiber optic cable. Machine screws are used to open and close the relative distance between adjacent segments thereby permitting the alignment of the fiber optic cable with a source of laser light.

17 Claims, 3 Drawing Sheets

FIBER OPTIC MOUNTING AND ALIGNMENT APPARATUS

This is a continuation of application Ser. No. 192,314, filed May 9, 1986 now abandoned.

BACKGROUND OF THE INVENTION

The present invention relates generally to fiber optic connectors and more specifically to an apparatus for mounting and aligning fiber optic cables.

In fiber optic transmission systems, it is desirable to couple as much of the transmitted light from a source, such as a laser diode, into the core of a fiber optic cable. One factor determining the amount of light that can be launched into a fiber optic cable is the alignment of the transmission source and the cable. If the angular difference between the axis of the transmission source and the axis of the cable is greater than the acceptance angle of the fiber optic cable, there is a loss of power launched into the cable.

The fiber optic cable connector art is replete with examples of fiber optic cable alignment methods. Many of these cable connectors use lenses to focus the light from one cable into another. The lenses and cables are maintained in precise alignment by a surrounding housing. Generally, these types of connectors do not have a way of making micro-adjustments to precisely align the lenses and cables for the maximum power transfer.

In Beasley et al, U.S. Pat. No. 4,447,119, there is described an apparatus for adjustably focusing a beam of light onto the end of an optical fiber. The device includes a framework for maintaining a focusing lens and one end of a fiber optic cable in a precisely controlled relationship. By adjusting the focal plane of the lens and the angle at which the beam of light impinges on the focusing lens, the beam can be directed through the lens to impinge on the core of the fiber optic cable. The size and complexity of this apparatus does not lend itself for use with an electronic instrument where size and weight ar critical factors.

What is needed is a small, easily manufacturable mounting and alignment apparatus which can be used to make micro-adjustments for accurate alignment of a fiber optic cable with a source of transmitted light.

SUMMARY OF THE INVENTION

A mounting and adjusting apparatus is provided with three segments having opposed parallel surfaces and an aperture formed in each segment along a central axis orthogonal to the parallel surfaces. Vertical alignment of the central axes of the segments place the segments in a stacked relationship and forms a central axis of the apparatus. Interconnecting means, such as integrally formed shoulders, are positioned adjacent to the periphery of the segments and formed to produce first and second angles between adjacent segments. The shoulders are rotated with respect to each other about the central axis of the apparatus to place them in an orthogonal relationship to each other. Adjusting means, such as vertically aligned apertures having a shouldered portion and a threaded portion for accepting and retaining a screw, are formed adjacent to the periphery of the segments and displaced from the shouldered interconnections along a line passing through the central axis of the apparatus. By rotational adjustment of the screws, adjacent segments are either brought closer together or forced farther apart. This in turn aligns the central axes of the top and middle segments with the central axis of the apparatus.

In the preferred use of the apparatus, a fiber optic cable having an attached focusing lens is inserted into the central aperture of the apparatus and affixed to the top segment. A beam of laser light is directed toward the lens along a line approximately parallel to the central axis of the apparatus. By adjusting the orthogonally displaced screws in the top and middle segments, the lens is positioned to receive the maximum amount of energy from the laser light.

The objects, advantages and novel features of the present invention are apparent from the following detailed description when read in conjunction with the appended claims and attached drawings.

Figure 1:
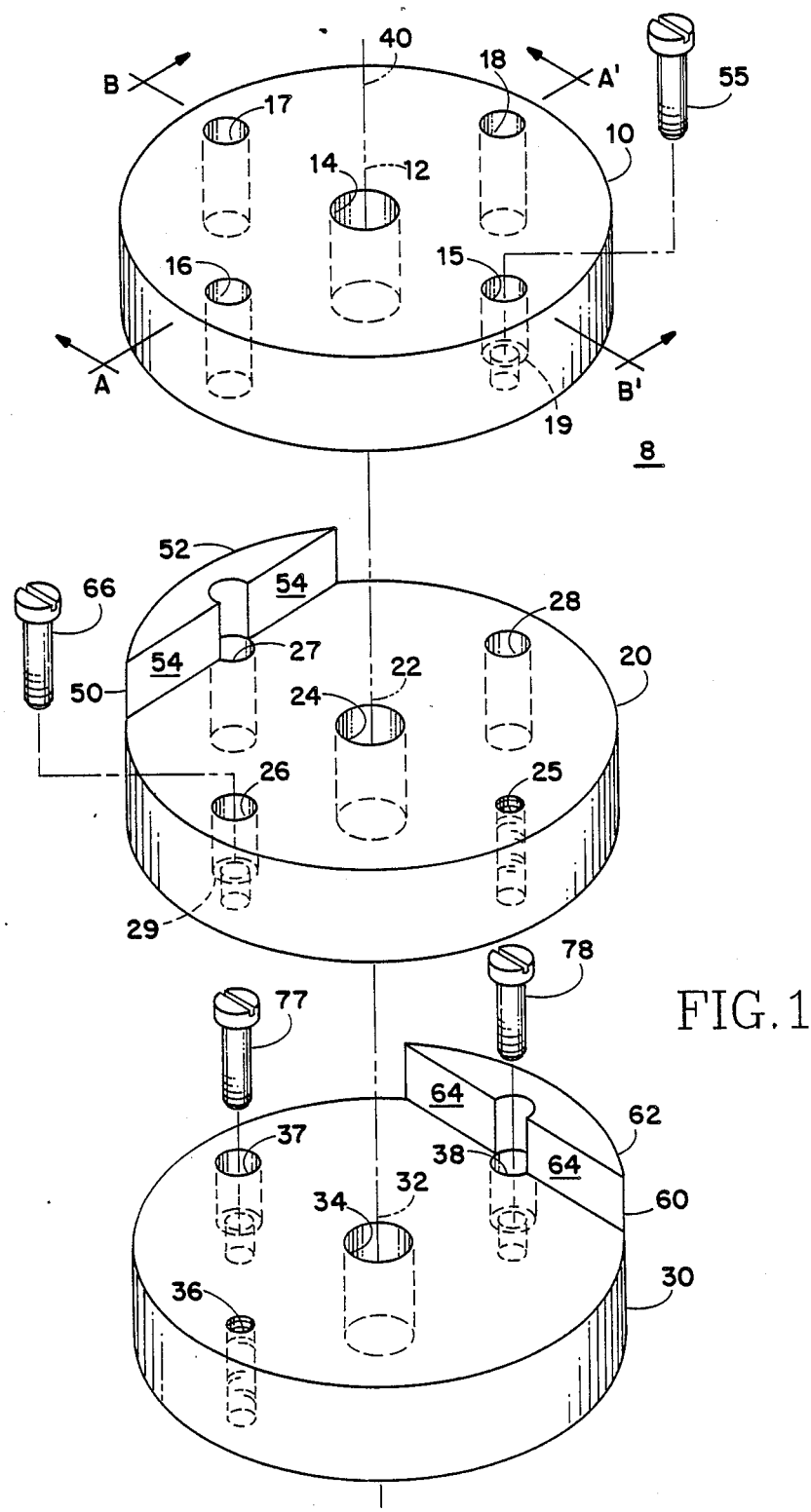
FIG. 1 is an exploded view of the mounting and aligning apparatus of the present invention.
Figure 2:
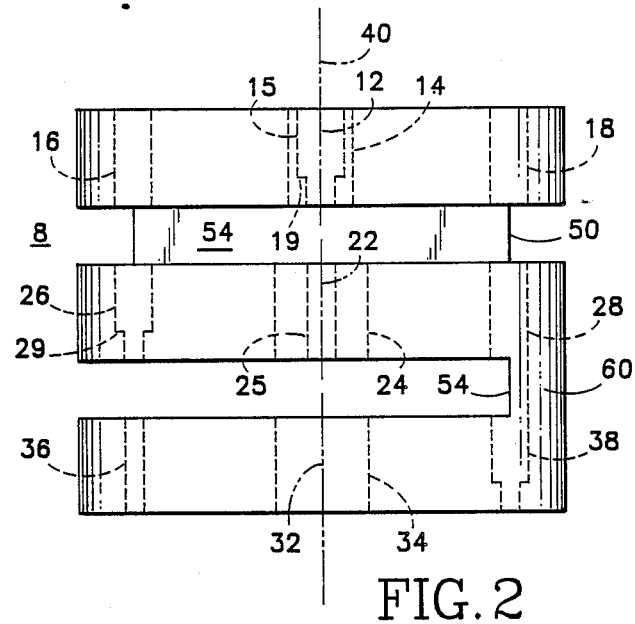
FIG. 2 is a side view of the mounting and alignment apparatus of the present invention.

DETAILED DESCRIPTION Referring to FIGS. 1 and 2, there are shown the apparatus of the present invention 8 having top, middle and bottom segments, respectively numbered 10, 20, and 30. In the preferred embodiment, each segment has a periphery defining a circular shape and opposed parallel surfaces. Each segment has a centrally located axis, respectively numbered 12, 22 and 32, that is normal to the opposed parallel surfaces. Co-existent with each segment axis is a circular aperture, respectively numbered 14, 24, and 34, passing through each segment. The diameter of apertures 24 and 34 are larger than the diameter of aperture 14. Vertical alignment of the segment axes 12, 22, and 32 forms a central axis 40 for apparatus 8 around which segments 10, 20 and 30 are aligned.

Interposed between the top and middle segments 10 and 20 and the middle and bottom segments 20 and 30 are interconnecting means 50 and 60. In the preferred embodiment, interconnecting means 50 and 60 are integrally formed shoulders with surfaces 52 and 62 co-existent with the peripheries of segments 10, 20, and 30. Surfaces 54 and 64 define chords connecting the end points of surfaces 52 and 62. Surfaces 52 and 62 subtend arcs on the circumference of segments 10, 20, and 30 that are substantially less than one-half of the circumference of the segments. Correspondingly, the chords defining surfaces 54 and 64 are substantially less than the diameter of the segments. Shoulder 50 is rotated with respect to shoulder 60 about the central axis 40 to orient surfaces 54 and 64 in an orthogonal relationship to each other. The interposing of the integrally formed shoulders 50 and 60 between segments 10, 20 and 30 establish slots between the adjacent segments. As will be discussed in greater detail below, the integrally formed shoulders are stressed to produce an angular relationship between adjacent segments and produce a starting bias point for adjustment of the segments.

Located adjacent to the peripheries of segments 10 and 20 and displaced laterally along a line, represented by sectional line B-B, passing through the central axis 40 and normal to the shoulder surface 54 are apertures 15 and 25. Similarly, located adjacent to the peripheries of segments 20 and 30 and displaced laterally along a line, represented by sectional line A-A', passing through the central axis 40 and normal to the shoulder surface 64 are apertures 26 and 36. As is shown in the drawing and inferred from the orthogonal relationship between shoulder surfaces 54 and 64, sectional lines A-A' and B-B' are orthogonal to each other.

Apertures 15 and 25 are in approximate vertical alignment to each other as are apertures 26 and 36. Apertures 25 and 36 have machine threads formed therein for accepting threaded machine screws 55 and 66. Apertures 15 and 26 have shoulders 19 and 29 formed therein for accepting and retaining machine screws 55 and 66. Aperture 16, a through bore, is formed in segment 10 to allow insertion of machine screw 66 in apertures 26 and 36. Apertures 15, 25 and machine screw 55 form the means for adjusting segment 10 with respect to segment 20 and apertures 26, 36 and machine screw 66 form the means for adjusting segment 20 with respect to segment 30.

Within segment 30 are apertures 37 and 38 which are formed with inwardly disposed shoulders the same as apertures 15 and 26. Aperture 38 is positioned to be in alignment with and partially intersecting shoulder surface 64. Aperture 37 is positioned to be orthogonal to 38 and in alignment with and partially intersecting the projection of shoulder surface 54. Apertures 37 and 38 accept and retain machine screws 77 and 78 for securing the mounting and aligning apparatus to a surface. In addition, in approximate vertical alignment with apertures 37 and 38 are respectively apertures 17 and 27 and 18 and 28. Apertures 17 and 27 allow the insertion of machine screw 77 into aperture 37 and apertures 18 and 28 allow the insertion of machine screw 78 into aperture 38.

In the preferred embodiment previously described, the material used possesses a high tensile strength and yield point. This allows for the establishment of a bias point when the integrally formed shoulders are stressed past the elastic limit of the material. Examples of such materials would be stainless steel or 7075-T6 aluminum. In forming the mounting and alignment apparatus of the present invention, a blank having top and bottom parallel surfaces and a circular configuration is used. Holes are drilled, counterbored, and threaded in the blank normal to the top and bottom surfaces to form the previously described apertures. Slots are cut into the blank parallel to the top and bottom surfaces to form the segments and the integrally formed shoulders. Adjacent segments are then forced apart to stress the integrally formed shoulders past the elastic limit of the material to produce a starting bias point. This allows the central axis of each segment to be adjusted through the central axis of the apparatus and returned to the starting bias point.

Figure 3A:
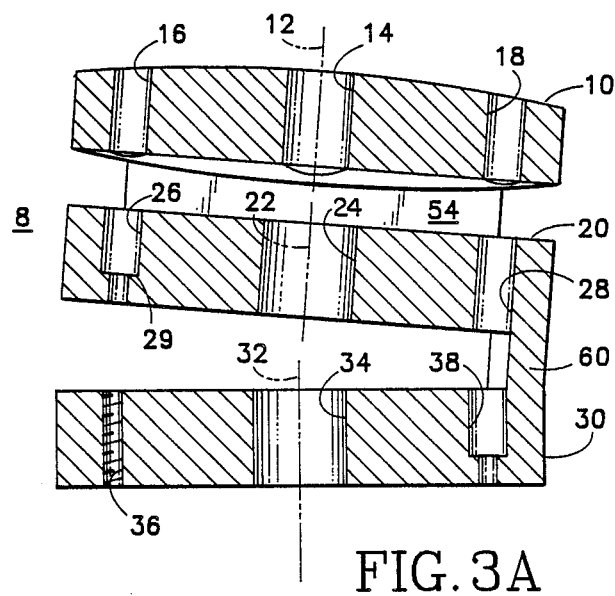
FIG. 3A and FIG. 3B are sectional views along lines A-A' and B-B' of FIG. 1 showing the angular relationships in exaggerated form of the segments of the present invention.
Figure 3B:
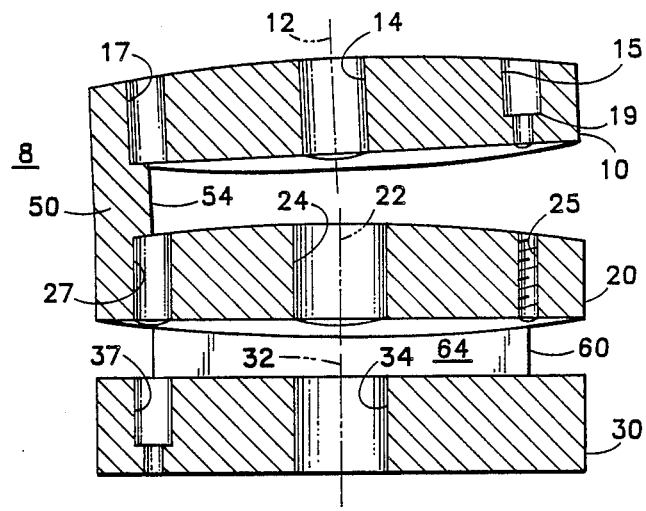

With reference to FIGS. 3A and 3B, there are shown cross-sectional views through the apparatus along lines normal to surfaces 54 and 64 of the integrally formed shoulders 50 and 60. In these views, the angular relationships between the various segments can be seen in an exaggerated form. In actual practice, the angle formed between two adjacent segments is dependent on the tensile strength of the material used and the size of the apparatus. For example, an apparatus formed from 7075-T6 aluminum having a overall diameter of 0.400 inches, a segment thickness of 0.100 inches, and a integrally formed shoulder thickness of 0.030 inches will have an angular displacement between segments of approximately 1 degree. This is equivalent to a vertical displacement of 0.005 inches between segments.

Figure 4:
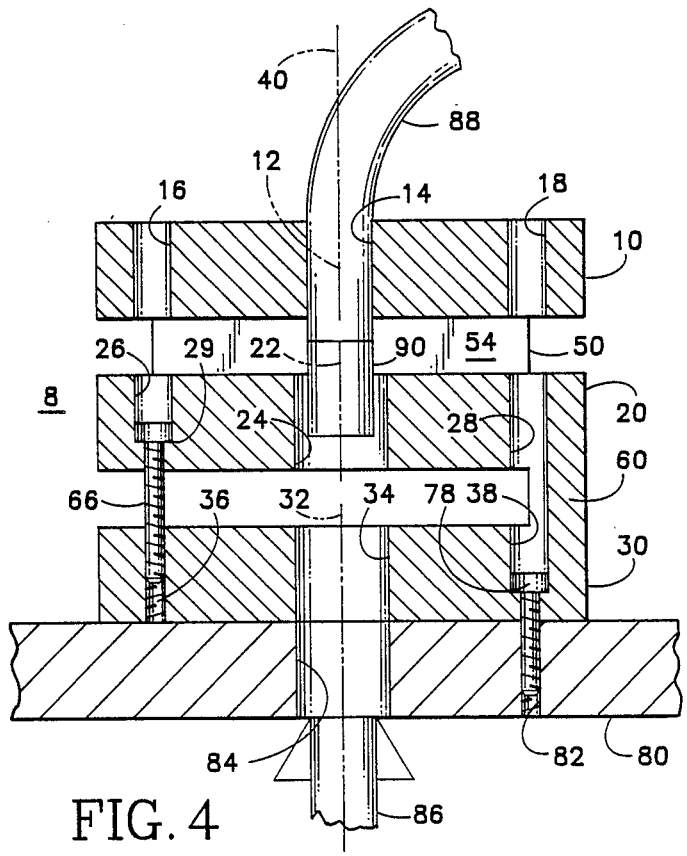
FIG. 4 is a sectional view showing the apparatus of the present invention used for the alignment of a fiber optic cable with a source of laser light.

Referring now to FIG. 4, there is shown a cross-sectional view of apparatus 8 in use within a fiber optic cable system. Apparatus 8 is mounted to assembly 80 by the engagement of screw 78 with threaded aperture 82 after aperture 34 is aligned with aperture 84. A source of laser light 86, produced by a laser diode (not shown), is directed through aperture 84 in approximate parallel alignment with axis 40 of apparatus 8. A fiber optic cable 88 having a rod lens 90 for focusing the laser light 86 into the core of fiber optic cable 88 is inserted into aperture 14 and secured by appropriate means, such as a set screw or gluing. The depth to which the rod lens 90 is inserted into apparatus 8 is not critical since the rod lens is free to move to the extent of the diameter of apertures 24 and 34 which are larger than the diameter of aperture 14. In the idealized drawing of FIG. 4, the beam of laser light 86, the rod lens 90, the axes 12, 22, and 32 of segments 10, 20, and 30 and the axis 40 of apparatus 8 are in exact parallel alignment so as to couple the greatest amount of light power into the core of the fiber optic cable 88. In normal use, micro-adjustments must be made in the fiber optic cable system to maximize the amount of light power launched into the core of the fiber optic cable. By concurrently adjusting screws 55 and 66 to increase or decrease the distances between adjacent segments in apparatus 8, the rod lens 90 is aligned with the incoming laser light 86 to couple the greatest amount of light power into the core of the fiber optic cable.

Establishing the orthogonal relationship between the integrally formed shoulders 50 and 60 and the angular relationship between adjacent segments 10, 20 and 30 by stressing shoulders 50 and 60 past the elastic limit of the material provides the maximum flexibility in orienting the axis of rod lens 90 within apparatus 8. Rod lens 90 is free to move within apparatus 8 to the extent of the diameters of apertures 24 and 34 and the yield point of shoulders 50 and 60. The adjustment of screws 55 and 66 decreases or increases the angular displacement between adjacent segments which in turn adjusts the axes 12 and 22 of apertures 14 and 24 and hence the axis of rod lens 90. Over-tightening of screws 55 and 66 past the yield point of the material prevents the segments from returning to the starting bias point when screws 55 and 66 are loosened. Over-tightening past the yield point can be prevented by choosing a slot width which precludes the possibility of tightening beyond the elastic limit of the material used.

The above described invention provides a small, easily manufacturable mounting and aligning apparatus for the alignment of a fiber optic cable with a source of laser light. Using a material with a high tensile strength, integrally formed shoulders can be formed in the apparatus that are stressed past the elastic limit of the material to provide a starting bias point for the adjustment of the fiber optic cable. Further, orienting the integrally formed shoulders in an orthogonal relationship with each other allows the adjustment of the fiber optic cable to any position within the apparatus. These and other aspects of the present invention are set out in the appended claims.

I claim:

1. A mounting and aligning apparatus for a fiber optic cable comprising:

topm, middle and bottom segments, each said segment having a periphery, opposed parallel surfaces and an aperture positioned on a central axis orthogonal to said surfaces, said central axes of said segments forming a central axis for said apparatus;

means for interconnecting said top, middle and bottom segments, said interconnecting means forming a first angle between said bottom and middle segments and a second angle between said middle and top segments, said interconnecting means between said bottom and middle segments being rotated with respect to said interconnecting means between said middle and top segments about said central axis of said apparatus to form a third angle; and means for independently adjusting said segments relative to each other.

2. The mounting apparatus of claim 1 wherein said apertures of said middle and bottom segments are larger than said aperture of said top segment.

3. The mounting apparatus of claim 1 wherein the interconnecting means comprises first and second integrally formed shoulders positioned on the periphery of said segments, said first shoulder formed between said bottom and middle segments and said second shoulder formed between said middle and top segments, said first shoulder being rotated with respect to said second shoulder about said central axis of said apparatus so as to be orthogonal to each other.

4. The mounting apparatus of claim 1 wherein the interconnecting means is deformable such that said central axes of said top and middle segments can pass through said central axis of said bottom segment.

5. The mounting apparatus of claim 1 wherein the adjusting means comprises near vertically aligned apertures positioned within adjacent said one of segments, said near vertically aligned apertures having an upper aperture with a formed shoulder therein and a lower threaded aperture, said upper aperture accepting and retaining a screw and said lower aperture threadably engaging said screw.

6. The mounting apparatus of claim 5 wherein the vertically aligned apertures are positioned adjacent to the periphery of said segments and displaced respectively from said middle and bottom segments interconnecting means and said middle and top segments interconnecting means along lines passing through said central axis of said apparatus for adjustably aligning said central axes of said top and middle segments with respect to said central axis of said bottom segment by movement of said screws within said near vertically aligned apertures.

7. The mounting apparatus of claim 1 further comprising means for mounting said apparatus to an object.

8. The mounting apparatus of claim 5 wherein the mounting means further comprises at least one aperture formed in said bottom segment and having a shouldered portion therein for accepting and holding a fastening device.

9. Apparatus for holding and positioning a fiber optic cable, comprising:

first, second and third segments, each having a pair of opposed major surfaces and an aperture extending between said surfaces, said segments being disposed in adjacent pairs with their apertures in coaxial alignment;

first means for varying the angular alignment of the aperture of said first segment relative to the aperture of said second segment; and second means for varying the angular alignment of the aperture of said second segment relative to the aperture of said third segment.

10. The apparatus of claim 9 further comprising first means for interconnecting said first and second segments at peripheral locations on confronting surfaces thereof, and second means for interconnecting said second and third segments at peripheral locations on confronting surfaces thereof, said first and second interconnecting means being angularly displaced about an axis orthogonal to the opposed major surfaces of said second segment.

11. The apparatus of claim 9 wherein said first and second varying means respectively include means for interconnecting said first and second segments, and second and third segments, said interconnecting means being disposed adjacent the periphery of each segment of said adjacent segment pairs.

12. The apparatus of claim 11 wherein said varying means further includes a threaded bore formed in one segment of each said adjacent segment pair for receiving a screw that engages the confronting surface of the other segment in said segment pair for varying the angle between said confronting surfaces of said pair during rotation of the screw in the threaded bore.

13. The apparatus of claim 12 wherein said threaded bore in each of said adjacent segment pairs is positioned opposite said respective first and second interconnecting means.

14. Apparatus for holding and positioning a fiber optic cable comprising:

first, second and third segments, each having a pair of opposed, substantially parallel surfaces and an aperture extending through each segment along an axis orthogonal to its said surfaces, said segments being disposed in adjacent pairs with their apertures in coaxial alignment;

first means for interconnecting said first and second segments at peripheral locations on confronting surfaces thereof, and second means for interconnecting said second and third segments at peripheral locations on confronting surfaces thereof, said first and second interconnecting means being angularly displaced about the orthogonal axis of said second segment; and means for independently varying the angles between the confronting surfaces of said first and second segments and the confronting surfaces of said second and third segments.

15. The apparatus of claim 14 wherein said varying means include means for interconnecting said first and second segments, and second and third segments, said interconnecting means being disposed adjacent the periphery of each segment of said adjacent segment pairs.

16. The apparatus of claim 15 wherein said varying means further includes a threaded bore formed in one segment of each said adjacent segment pair for receiving a screw that engages the confronting surface of the other segment in said segment pair for varying the angle between said confronting surfaces of said pair during rotation of the screw in the threaded bore.

17. The apparatus of claim 16 wherein said threaded bore in each of said adjacent segment pairs is positioned opposite said respective first and second interconnecting means.

* * * * *